V. GROVER.
AUTOMOBILE SLED.
APPLICATION FILED AUG. 25, 1910.
999,160.
Patented July 25, 1911.
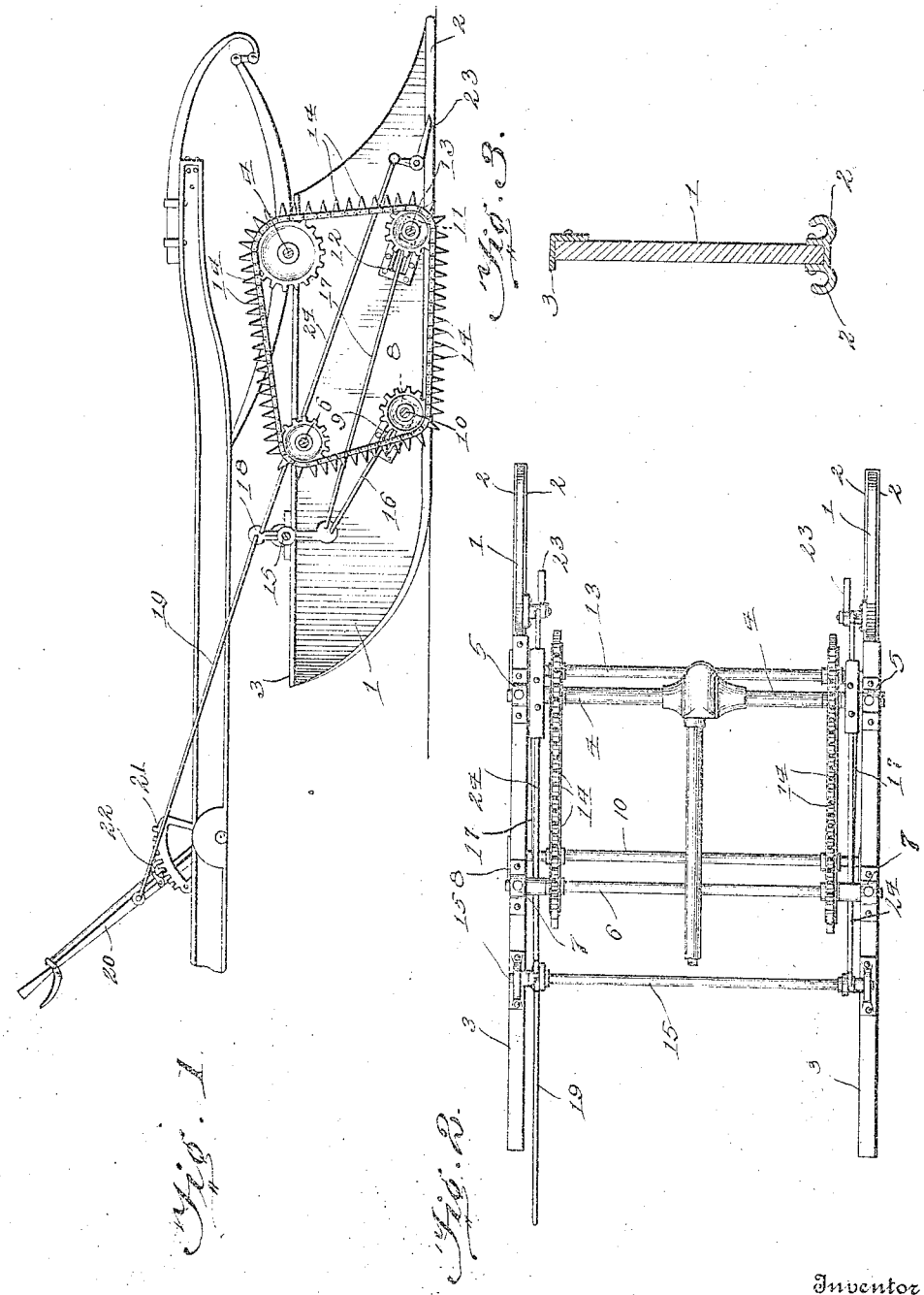
Witnesses
Frederick L. Foe.
James A. Lodell
Inventor
Vernon Grover:
By Victor J. Evans
Attorney

UNITED STATES PATENT OFFICE.

VERNON GROVER, OF MINA, SOUTH DAKOTA.

AUTOMOBILE SLED.

999,160.  Specification of Letters Patent.  Patented July 25, 1911.

Application filed August 25, 1910. Serial No. 578,924.

*To all whom it may concern:*

Be it known that I, VERNON GROVER, a citizen of the United States of America, residing at Mina, in the county of Edmunds and State of South Dakota, have invented new and useful Improvements in Automobile Sleds, of which the following is a specification.

This invention relates to automobile sleds, the object of the invention being to provide apparatus of this character embodying novel propelling mechanism which may be conveniently and effectively thrown into or out of gear at the will of the operator.

Another object of the invention is to provide improved brake mechanism which will be moved to its set position when the propelling mechanism is thrown out of gear to bring the sled to an almost immediate standstill.

In the drawing, forming a portion of this specification and in which like numerals of reference indicate similar parts in the several views:—Figure 1 is a detail longitudinal section through my improved sled. Fig. 2 is a top plan view thereof with parts removed to clearly illustrate the invention. Fig. 3 is a detail section through one of the runners.

My improved sled comprises spaced runners 1 whose lower running edges are formed to provide diametrically oppositely curved running surfaces 2. At the upper end, each runner has secured thereto an angle iron member 3. A drive shaft 4 is supported in boxes 5 which are secured to the angle iron members 3 adjacent to the rear end of the sled. Forwardly of the drive shaft is a driven shaft 6 which is mounted in boxes 7 on the said angle iron members 3. Movable bearing boxes 8 are located approximately beneath the shaft 6 and as illustrated, they are slidable in guide members 9 on the runners. The boxes 8 are connected with each other by a shaft 10. Rearwardly of the boxes 8 and located substantially beneath the shaft 4 are boxes 11 which are slidable in guides 12 on the runners. The boxes 11 are connected with each other by a shaft 13.

A pair of sprocket wheels is provided for each of the shafts hereinabove named, and as illustrated, propelling chains are operatively associated with the sprocket wheels to be driven thereby when power is applied to the drive shaft 4. Power may be applied to the drive shaft by means of any well known form of motor (not shown). The propelling chains are provided with calks 14 for engagement with the surface of the ice to insure a positive propulsion of the sled on operation of the drive shaft.

A rock shaft 15 is supported by the runners of the sled, and as illustrated, it is connected with the boxes 8 by links 16 and with the boxes 11 by similar links 17. The shaft 15 is provided with a crank arm 18 which is connected with one end of a rod 19, the opposite end of the rod being connected with the controlling lever 20. The lever 20 is preferably pivotally mounted on the rack segment 21 and it is desirable to employ a locking pawl such as the one shown at 22 for engaging the teeth of the rack segment to hold the controlling lever in the desired adjusted position.

A brake member 23 is pivotally supported by the sled and it is connected by the link 24 with the controlling lever 15 so that it may be moved to its set and unset positions as the occasion may demand. In operation of the sled described and illustrated herein, power is transmitted to the shaft 4 so as to revolve the propelling chains. The shafts 10 and 13 are located in a horizontal plane with each other so that portions of the propelling chains assume horizontal positions to cause their spurs to contact respectively with the running surface. The controlling lever 20 can be operated to move the shafts 10 and 13 in unison so as to cause the upwardly extending runs of the chain to be moved slightly in a forward direction; but sufficient to cause the lower run to be elevated above the surface of the ice. Simultaneously with this operation the brake element is thrown into contact with the surface to bring the sled to an almost immediate standstill. The shafts 4, 6, 10, 13 and 15 are preferably formed in sections and are connected with each other by universal joints. From this construction I provide for oscillatory movements of the runners to allow them to accommodate themselves to uneven surfaces.

I claim:—

A sled including spaced parallel runners, upper parallel driving and driven shafts journaled in fixed bearings on the runners, slidably adjustable bearings mounted in the runners and disposed below the plane of the shafts, driven shafts mounted in the slidably mounted bearings, alining sprocket gear wheels fixed to the shafts, a propelling chain extending around the sprocket gear wheels and arranged thereon to present upper and lower runs and front and rear runs, the lower run being operatively extended below the plane of the lowermost points of the runners for effective driving contact with the surface on which the sled is supported, and a controlling mechanism operatively connected with the slidable bearings and adapted for operation to move the bearings to positions to cause the end run of the driving chain to be moved forwardly and upwardly whereby the lower run of the chain will be disposed above the plane of the lowermost points of the runners.

In testimony whereof I affix my signature in presence of two witnesses.

VERNON GROVER.

Witnesses:
R. E. GROVER,
O. G. ANDERSON.